Patented June 21, 1938

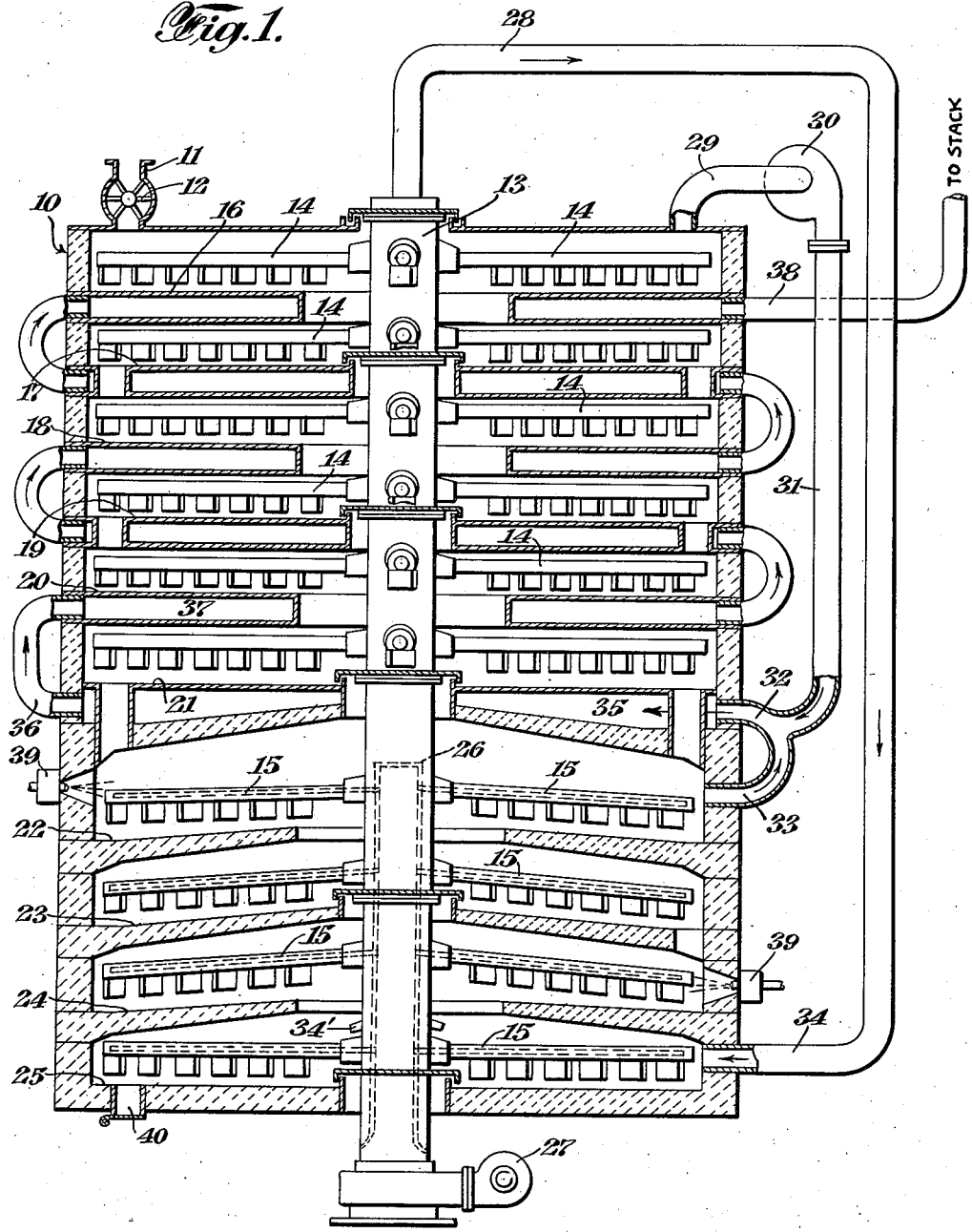

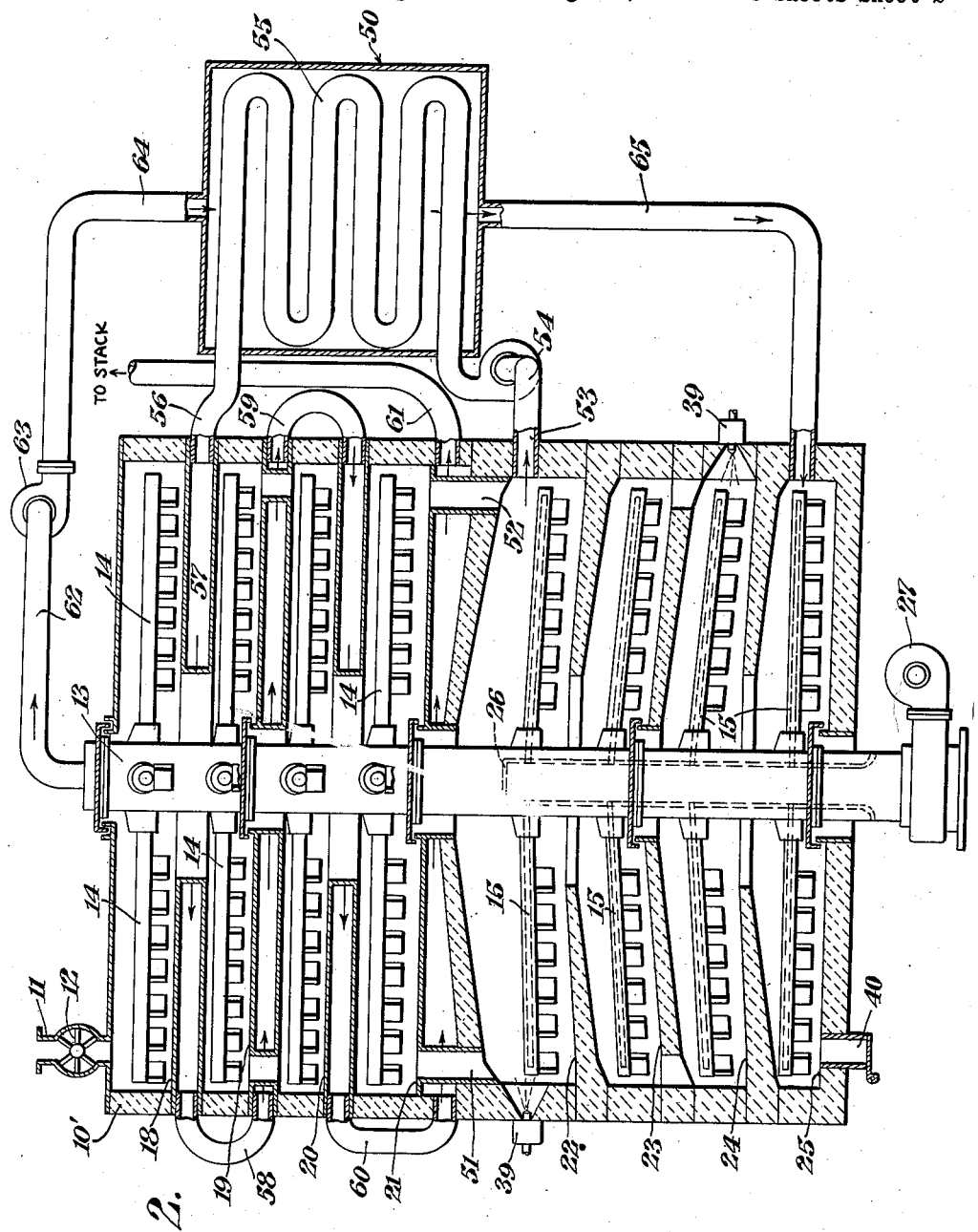

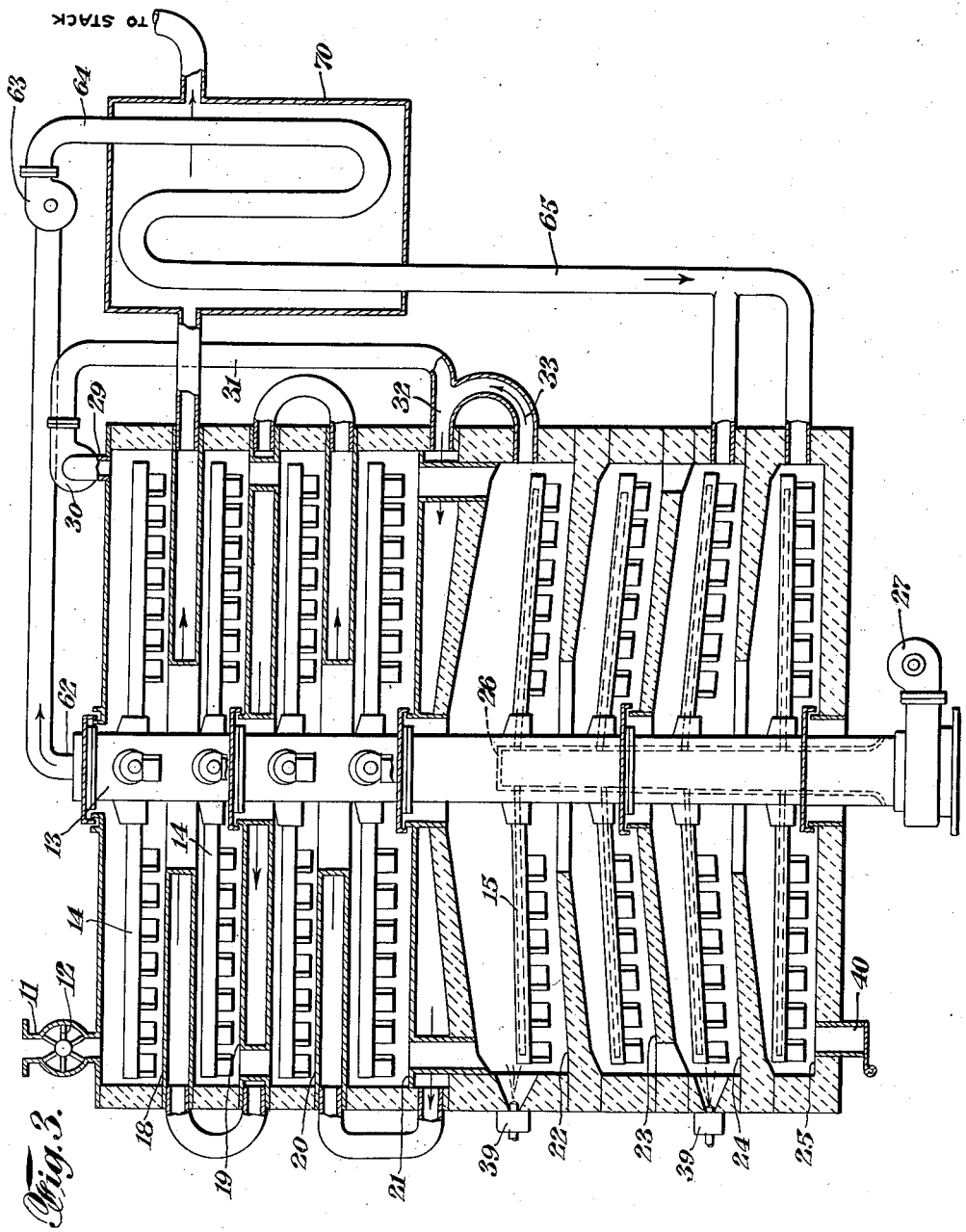

2,121,662

UNITED STATES PATENT OFFICE 2,121,662

INCINERATION OF SEWAGE SLUDGE AND OTHER WASTE MATERIALS

Henry J. Hartley, Hastings on Hudson, N. Y., and Dudley Baird, Berkeley, Calif., assignors to Nichols Engineering & Research Corporation, New York, N. Y., a corporation of Delaware Application August 18, 1936, Serial No. 96,576
Renewed February 19, 1937

22 Claims. (Cl. 110—12)

This invention relates to methods and apparatus for incinerating waste material, such for example as sewage sludge, and embodies various improvements and modifications of the method and apparatus of the patent to Dudley Baird and Robert W. Rowen, No. 2,015,050, granted September 17, 1935.

This invention in one of its phases is directed to economizing features whereby the incineration process may be maintained under normal conditions once it is started, without requiring the use of extraneous fuel. That is, the fuel value of the sewage sludge or other waste material, even when embodying a substantial water content, is utilized with such a high degree of efficiency that the use of any other fuel may be avoided, thus effecting a very great saving in the annual operating costs of the equipment.

With the apparatus disclosed in the above mentioned patent to Baird and Rowen, sewage sludge or the like is first treated as by filtering for example, to eliminate some of the water content and to form filter cake or the like, which is introduced into a multiple hearth furnace and rabbled over each hearth and from hearth to hearth down through the furnace in the presence of a countercurrent stream of air for supporting combustion, evolved gases and vapor. The gases and vapor and remaining air are withdrawn at the top of the furnace and then passed through a recuperator to preheat the supply of intake air for the furnace. While with this arrangement, sewage sludge may be incinerated at a cost generally far below that of carting away and disposal of the sludge on free dumps and the process may sometimes be carried on for considerable periods without the use of extraneous fuel, yet if the quantities of the sludge supply or its moisture content are irregular as is generally the case, then it may be advisable to burn considerable fuel so that this item may become one of the largest of the operating costs. With such equipment it appears necessary or advisable to subject the gases and vapor evolved from the sludge being dried and incinerated, to a temperature in the neighborhood of 1100° F. or higher at some point after these gases and vapor leave the sludge and before they are discharged to the atmosphere, in order to assure elimination of noxious odors therefrom. Thus, when these gases and vapor leave the furnace, they ordinarily evolve a great quantity of heat. While as disclosed in said patent to Baird and Rowen, the major portion of such heat may be recovered in a recuperator used to preheat the intake air, yet even after all of the intake air is preheated to as high a temperature as is possible in a practical recuperator, there will still be an excess of useful heat available in the gas, vapor and air mixture discharged from the recuperator to the stack. This remaining useful heat cannot be practically absorbed by merely heating more intake air, because it will ordinarily serve no useful purpose to supply a larger quantity of intake air than is required for combustion purposes, plus a factor of safety, say of 50%. Any use of a larger quantity of preheated intake air will merely require that more air be heated up to incineration temperatures within the furnace, to no advantage. A mere increase in size or extent of the recuperator will not result in a recovery of the excess useful heat in the exit gases, because as above stated, a recuperator of reasonable normal size will heat all of the intake air which it is advisable to use, to a temperature as near that of the exit gases as is possible with any recuperator of commercially practical efficiency.

Since the exit gases from furnaces of the type disclosed in the Baird and Rowen patent, include substantial quantities of water vapor evolved from the drying sludge as well as evolved gaseous products of combustion, these exit gases and vapors will not only be greater in weight than the intake air, but the specific heat of the exit gas and vapor mixture will be substantially higher than that of the intake air. These factors present a difficult problem in attempting to transfer all of the useful heat of the exit gases and vapor into the intake air, or otherwise back into the furnace so as to save enough of the heat of the exit gases and vapor to safely avoid the necessity of using extraneous fuel.

According to the present invention, we have solved this problem by transferring heat from the exit gases and vapor, back into the furnace, by passing such gases and vapor through a series of chambers within the furnace, whereby a number of the hearths, particularly the drying hearths carrying the relatively wet and cool waste material, may be muffle-heated. In this way the hot gases and vapor are brought into heat exchanging relationship with the relatively cooler bodies of waste material which have a weight and specific heat great enough to permit the useful heat of the exit gases and vapor to be absorbed and utilized in the furnace in drying the waste material. Thus sufficient heat from the exit gases and vapor is restored to the furnace so that in normal operation the use of extraneous fuel is unnecessary. According to the preferred form of this invention, such solution of the problem also eliminates the necessity of using any recuperator apart from the furnace construction itself. The elimination of the use of one or more recuperators, as heretofore provided with equipment of this type, makes possible a great saving in the original cost of the equipment, inasmuch as dependable and efficient recuperators are quite expensive, as is also the special piping usually required for each recuperator installation and the extra building space required therefor. The elimination of the recuperators also effects a considerable saving in the operation of such equipment, since according to our invention in its preferred form, the unit may be largely self-contained within the furnace walls with a consequent reduction in radiation of heat from hot gas conduits, etc. And as a result of this conservation of heat, sludge or other waste material of unusually high water content may be dried and incinerated, still without the use of extraneous fuel. The expense of preliminary dewatering operations, such as filtering, may accordingly be reduced.

According to other embodiments of our invention, the exit gases and vapor from the furnace may also be utilized in a recuperator for heating intake air for supporting combustion in the furnace, such recuperator being arranged to receive the exit gases and vapor either before or after passage thereof through the muffle-heating chambers of the furnace. With such constructions the burning of extraneous fuel may be avoided through the use of a comparatively small number of muffle-heated hearths in conjunction with a relatively small and inexpensive recuperator.

Further features of our invention may include arrangements whereby the hot gaseous products of combustion from the incinerating hearths, may be withdrawn from the furnace, the vapor from the drying hearths being separately withdrawn and mixed with the hot gases for insuring destruction of noxious odors of the vapor. In this way the comparatively small quantity of fluid (vapor) discharged from the drying hearths, may be efficiently heat treated by the hot gases, it being unnecessary to pass the relatively large volume of hot gases and excess air through the drying hearths. Thus it is also unnecessary to maintain such gases and air at odor-destruction temperatures in the presence of the cold incoming sludge. With this arrangement the vapor from the drying hearths may be also heat treated to eliminate odor thereof without necessarily passing the vapor through the incineration zones of the furnace where the proper incineration conditions might be interfered with.

Various further and more specific objects, features and advantages will clearly appear from the detailed description given below taken in connection with the accompanying drawings which form a part of this specification and illustrate merely by way of example preferred forms of the apparatus of the invention.

The invention consists in such novel features, arrangements and combinations of parts as may be shown and described in connection with the apparatus herein disclosed, and also such novel methods and combinations of method steps as are disclosed and described herein.

In the drawings Fig. 1 illustrates one form of apparatus embodying the invention and in which the method of the invention may also be carried out; and Figs. 2 and 3 are alternative embodiments of the apparatus.

As explained in the above mentioned patent to Baird and Rowen, sewage sludge or the like waste material as available from sewage treatment plants, may first be passed through a suitable filter or other dewatering equipment to provide a solid or semi-solid filter cake, or the like, having a moisture content ranging from in the neighborhood of 50–60% up to 85%, for example. In most cases a sewage sludge filter cake having a moisture content of in the neighborhood of 70% may be readily obtained, although of course the invention may be used to incinerate a cake having a lower or higher moisture content.

After a substantial portion of the moisture has thus been eliminated, the sludge may be conveyed to the top of a multiple hearth furnace 10, as shown in Fig. 1, and introduced therein through a suitable inlet feeding device 11 designed to more or less continuously admit the sludge into the top of the furnace and at the same time serving to seal the inlet opening against escape of gases at this point. In the particular form shown the feeding device 11 may include a revolving member 12 having a number of vanes forming pockets for receiving the sludge and delivering it to the furnace and at the same time serving to seal off the inlet against escape of gases.

The multiple hearth furnace 10 may comprise a rotatable hollow central shaft 13 extending vertically up through the middle of the furnace and carrying a plurality of rabble arms as at 14, 15, for rabbling the material in succession over superposed hearths as at 16 to 25 respectively. It will be understood that alternate hearths such as hearths Nos. 16, 18, etc., may be provided with central discharge openings, whereas the remaining hearths may be formed with peripheral discharge openings whereby the material may be rabbled inwardly and outwardly of alternate hearths respectively and down through the furnace while being first dried and then incinerated. The entire furnace structure may be enclosed within a cylindrical wall in the usual manner.

In the particular example shown, hearths 22 to 25 may be constructed of brick or the like in the usual manner. At least the greater part of the incineration will occur on these hearths and accordingly they are constructed in a manner to resist high temperatures. On the other hand, the greater part of the drying of the sludge may occur on hearths 16 to 21 and these hearths may be constructed of a suitable heat resistant alloy steel to facilitate the efficient transmission of heat from muffle cavities (hereinafter described) into the underside of the layers of sludge on each drying hearth, whereby the drying may proceed more efficiently and rapidly.

The central shaft 13 may be provided with an internal conduit 26 receiving air from a blower or the like at 27 and conducting such air into internal conduits within rabble arms 15 (and also arms 14 if desired), in a manner similar to the cooling conduit arrangement in the shaft and rabble structure of the above mentioned Patent No. 2,015,050. That is, the cooling air may pass up through the internal shaft conduit 26, then through the internal conduits of the rabble arms to the ends of such arms and back through the outer annular spaces in the rabble arms to the annular space within shaft 13 exteriorly of conduit 26. The cooling air upon reaching such annular space, will of course be substantially preheated and this preheated air may be conducted through the upper part of shaft 13 and out through a conduit 28.

In the particular construction shown, the six upper hearths are each indicated as provided with four rabble arms in order to insure frequent rabbling of the relatively bulky wet material being dried on these hearths. On the other hand, the lower hearths are shown as each provided with but a single pair of rabble arms so that the sludge material being incinerated on the lower hearths will rest for a somewhat longer period on each hearth to enable thorough incineration. It will of course be understood that a greater or lesser number of the drying hearths and incinerating hearths may be provided, depending upon the particular conditions met with in each installation, and the ratio of the number of drying hearths to the number of incinerating hearths may be altered to suit various conditions.

In the construction shown, as the material is rabbled over the various drying hearths as at 16 to 21 inclusive, it comes in contact with a countercurrent stream of hot vapor rising up through the various discharge ports of these hearths and over each of these hearths in succession. That is, such hot vapor is evolved from the material drying on the various hearths and as the vapor rises from the lower and hotter drying hearths, it serves to supply heat for drying the relatively colder material on the upper drying hearths. This stream of vapor may be withdrawn from adjacent the top of the furnace through a conduit 29 by means of a blower 30, which may be used to force such vapor down through a conduit 31, thence to a conduit 32 for purposes hereinafter referred to.

As the partially dried waste material is rabbled over the various incineration hearths, such as hearths 22 to 25 inclusive, it comes in contact with a countercurrent stream of evolved gaseous products of combustion, together with air used to support the combustion, this stream rising up through the various discharge ports of each of these hearths and in contact with the material being incinerated thereon, and thence out through a hot gas exit conduit at 33, this exit opening being preferably adjacent the upper incineration hearth 22 or where the temperatures are at substantially the maximum within the furnace. The air for supporting combustion may be introduced at one or more of the lower incineration hearths, as through a conduit 34, connecting with the above mentioned conduit 28, whereby air heated in the rabbling structure serves to provide an adequate supply of preheated air for supporting combustion within the furnace.

The hot gaseous products of combustion, together with excess air not used for combustion, upon passing through the exit conduit at 33, become mixed with the vapors from the drying hearths as fed into conduit 32. The gases and air as withdrawn from the furnace through conduit 33 are preferably at a temperature sufficiently above approximately 1100° F. so that when the same become mixed with the vapor within conduit 32, the resulting mixture will be at a temperature in the neighborhood of 1100° F. or higher to thereby decompose any possible odoriferous content that may exist in the vapor withdrawn from the drying zones. From the conduit 32 the gas, air and vapor mixture may be led into and through a muffle-heating chamber 35 beneath hearth 21, thence through a connection 36 into a muffle-heating chamber 37 within hearth 20, and so on through a series of connecting conduits and muffle chambers within the hearths 19, 18, 17 and 16, respectively. Finally, after the gas, air and vapor mixture has passed through the various muffle chambers, the useful heat of this mixture will have become so largely absorbed that the mixture may be discharged as through a conduit 38 to a stack, or if desired, in some cases the remaining small quantity of heat in the mixture may be passed through a heating system for the plant. This gas and vapor mixture will embody practically no smoke and as a result of the thorough heat treatment thereof within conduit 32 as above explained, will embody no perceptible odor and may therefore be discharged to the atmosphere without danger of annoyance to the inhabitants of the vicinity. Since the gaseous products of combustion are withdrawn through conduit 33 from one of the hottest parts of the furnace, this will insure that all of such gases as well as the vapor which is thereupon mixed therewith, will be subjected to a temperature sufficient to safely destroy noxious odors thereof. It will be noted that after the high temperature gases and vapor are mixed within conduit 32, they have no further opportunity for becoming contaminated by the odoriferous drying or burning sludge.

In order to preliminarily bring the furnace structure up to the desired operating temperatures for starting the process or to provide sufficient heat to meet any unusual conditions, a number of fuel burners as at 39 may be provided at various hearths of the furnace.

The above described circulation of the air, gases and vapor through the various parts of the furnace, may be controlled by regulating the speed of the blowers or fans 27 and 30 or by providing dampers of well-known construction at various points in the several conduits and the stack, the suction from which serves to withdraw the gases and vapor mixture through the muffle-heating chambers. The air, gas and vapor pressures should preferably be so regulated that no zones within the furnace will be subjected to pressures sufficient to cause noxious gases to be expelled through the inspection doors, etc., of the structure. Also, sub-atmospheric pressures sufficient to cause any excessive intake of cold air into any part of the equipment, should be avoided. With the above described arrangement avoiding the use of recuperators, which ordinarily have considerable resistance to the flow of gases, it is also possible to avoid using as many blowers as with systems employing recuperators. This will result in a considerable saving in installation and operating costs.

The ash resulting from the incineration of the sewage sludge or other waste material, may be finally passed out through a discharge opening at 40 at the bottom of the furnace.

With the equipment as above described, using a furnace of about ten hearths as shown, and of about 20 feet in outside diameter, at least 125 tons of filter cake embodying 75% moisture or more (having dry solids which are 50% combustible) may be treated in twenty-four hours. With such operation the temperature of the exit gases passing through conduit 33 may be readily maintained sufficiently higher than 1100° F. so that the vapor and gas mixture at 32 will be at a temperature of 1100° F. or higher, to safely eliminate odors from the mixture. The vapor may be drawn off from the top of the furnace through conduit 29 at a temperature in the neighborhood of 250° F., for example. The gas and vapor mixture entering the lower muffle heating cavity 35 may be maintained at a temperature in the neighborhood of 1100° F. and the mixture as finally discharged through conduit 38 to the stack will be reduced to a temperature of 400-450° F. or thereabouts. The air introduced through blower 27 on passage through the cooling conduits of the rabbling system, may be preheated to a temperature of about 450° F. and a sufficient amount of preheated air may be supplied in this way to insure prompt and thorough incineration of the waste material in the incineration zones, leaving practically no organic matter in the resulting ash discharged through outlet 40. The above temperatures are given on the basis of operating the equipment without using the fuel burners once the equipment has been brought up to temperature. Thus it is apparent that with sludge containing as much as 75% or even more of moisture, an excess of heat is made available from the heat of the combustion of the sludge alone, without other fuel.

With the equipment of Fig. 1 under some circumstances it may be desirable to introduce the hot gas and vapor mixture first into an upper muffle-heating cavity and then through the lower muffles in succession in a manner similar to that of Fig. 2, which will hereinafter be explained in further detail. In this way a greater amount of heat may be immediately applied to the incoming cold sludge to insure prompt initiation of the drying operation and at a point where the sludge is sufficiently wet, so that it will not become prematurely scorched and accumulate in large bodies with interiors protected against the drying temperatures. It may also prove desirable under some circumstances, with the arrangement of Fig. 1, to cause the stream of vapor evolved from the material on the drying hearths to pass over the several hearths in succession downwardly through the drying zones, instead of upwardly, in a manner similar to that explained hereinafter in connection with Fig. 2. This has the advantage of causing the vapor to become heated to a somewhat greater extent before the same is mixed with the hot gases for destruction of odors.

Regardless of whether the vapor is passed downwardly or upwardly through the drying zones, the equipment as shown provides an efficient means for withdrawing the evolved vapor separately from the hot gaseous products of combustion, then heat-treating such vapor to eliminate odor and finally utilizing the heat of the gas and vapor mixture to the extent necessary to avoid using extraneous fuel, all without the necessity of providing any gas seals for any of the ports of the hearths through which the material is discharged from hearth to hearth. Thus, several well recognized difficulties of operating and maintaining any such seals are avoided and in fact, it is unnecessary to predetermine any sharply defined separation between the drying zones and the incineration zones or areas. However, if desired, the drying portion of the furnace instead of being integrally embodied with the incineration portion, may be separated therefrom and means may be provided for transferring the dried or partially dried sludge from the drier to the incinerator.

If desired, instead of using the conduits 28 and 34, preheated air may be admitted from the central shaft directly to the lower hearths, as through openings 34', for example. Radiation losses at these conduits may thus be eliminated and the remaining conduits may if desired, be installed within the insulation of the furnace walls for the same purpose.

In Fig. 2 a similar furnace construction 10' is illustrated, this furnace, however, being provided with a smaller number of muffle-heated drying hearths whereby a part of the useful heat of the exit gases may be utilized for heating the muffle hearths, but another part of such heat may first be used in a recuperator as at 50 for supplying heat to intake air for supporting combustion in the incineration zones. With the arrangement of this figure the vapors evolved from the drying material on hearths 18 to 21, are allowed to flow over these hearths in succession downwardly through the drying zones and through hearth ports as at 51 and 52, where they become mixed with the hot gaseous products of combustion over hearth 22 and the resulting mixture may be withdrawn at a temperature in the neighborhood of 1100° F. or above, through an exit opening 53. A blower as at 54 may be used to conduct this mixture from the exit 53 through conduits 55 of the recuperator 50, thence through an intake conduit 56 to the upper hearth muffle-heating cavity 57. From cavity 57 the mixture may pass in succession through the lower muffle-heating cavities through connecting conduits as at 58, 59 and 60. When the gas and vapor mixture has passed through the muffle-heating cavity of hearth 21, the useful heat thereof available for recovery will have been sufficiently absorbed so that the mixture may be passed through a conduit as at 61 to the stack without any objectionable loss of heat value.

A supply of air in passing through the cooling conduits of the rabbling system substantially as in Fig. 1, may be withdrawn through a conduit 62 preheated to a temperature of 400° F., for example. A fan as at 63 may be provided for forcing this air through a conduit 64 into the recuperator 50 in heat exchanging relationship with the gas and vapor mixture within recuperator conduits 55, whereby this air supply will be further preheated before passage through a conduit 65 into a lower incinerating zone of the furnace.

With the arrangement of Fig. 2, as in the case of Fig. 1, the sludge may be efficiently burned without the use of extraneous fuel and with a somewhat lower initial cost for the furnace construction due to the smaller number of muffle-heated hearths, although in some cases the saving in expense of hearths may be unjustified in view of the addition of the recuperator. With the arrangement of Fig. 2, if it is found that the vapor from the drying zones by passing over the upper incineration hearth should interfere with the incineration process, such vapor may be led out from one of the lower drying zones and mixed with the hot exit gases at a point outside the furnace as in Fig. 1.

The arrangement shown in Fig. 3 is similar to that of Fig. 2, except that the hot exit gases after mixture with the vapors from the drying zone, are passed first through the heating cavities of the muffle hearths and then through a recuperator as at 70, whereas in Fig. 2 as above explained, the gas and vapor mixture is first passed through a recuperator. Also, it will be observed that in Fig. 3 the vapor from the drying zones is allowed to pass upwardly through the drying zones and is withdrawn from an upper zone and thereafter mixed with the hot exit gases in a manner similar to Fig. 1. Parts of Fig. 3 corresponding to various portions of Figs. 1 and 2 respectively, are identified by like reference numerals and accordingly the construction and operation of the arrangement of Fig. 3 will be apparent from the above descriptions of the other embodiments of the invention.

While specific examples of operation of the equipment have been given above in connection with the treatment of sewage sludge, it will be understood that the apparatus is similarly adapted to dry and incinerate other waste materials having similar characteristics, so far as concerns their susceptibility to being dried and incinerated in apparatus of this type. For example, the sewage sludge may be mixed with quantities of garbage or trash in such form as may be satisfactorily rabbled through the furnace, and in the appended claims where reference is made to "sewage material", this expression is intended to comprehend such other waste materials, separately or mixed, even though such other waste materials may not in all cases have been delivered to the equipment after passage through a sewage system.

While the invention has been described in detail with respect to certain particular preferred examples which give satisfactory results, it will be understood by those skilled in the art, after understanding the invention, that various changes and modifications may be made without departing from the spirit and scope of the invention, and it is intended, therefore, in the appended claims to cover all such changes and modifications.

Alternative embodiments of the invention are described and claimed in applicants' copending application Ser. No. 73,620, filed April 10, 1936, of which this case forms a continuation in part.

What is claimed as new and is desired to be secured by Letters Patent of the United States is:

1. Apparatus for drying and incinerating waste material, which comprises a furnace having a plurality of superposed hearths including a top drying hearth or hearths and a lower incinerating hearth or hearths, means for feeding the material onto the top hearth, rabbling means cooperating with each hearth for agitating and advancing the material over each hearth and gradually from hearth to hearth down through the furnace, an opening adjacent an upper incinerating hearth through which hot gaseous products of combustion may be withdrawn, an opening from a drying hearth through which vapor evolved from the drying material may be withdrawn, said drying hearth or hearths being formed with muffle-heating cavities, means for mixing said withdrawn vapor with said gaseous products of combustion at a point adjacent said incineration hearth opening, and means for conducting the mixture through said cavities whereby substantial quantities of the heat of said mixture are transferred to the drying hearth or hearths.

2. Apparatus for drying and incinerating waste material, which comprises a furnace having a plurality of superposed hearths including a top drying hearth or hearths and a lower incinerating hearth or hearths, means for feeding the material onto the top hearth, rabbling means cooperating with each hearth for agitating and advancing the material over each hearth and gradually from hearth to hearth down through the furnace, an opening adjacent an upper incinerating hearth through which hot gaseous products of combustion may be withdrawn, an opening from a drying hearth through which vapor evolved from the drying material may be withdrawn, said drying hearth or hearths being formed with muffle-heating cavities, means for mixing said withdrawn vapor with said gaseous products of combustion at a point adjacent said incineration hearth opening, means for conducting the mixture through said cavities whereby substantial quantities of the heat of said mixture are transferred to the drying hearth or hearths, said rabbling means being formed with cooling conduits whereby a stream of air may pass therethrough and become heated, and means for conducting such heated stream of air into contact with the material on an incinerating hearth for supporting combustion.

3. Apparatus for drying and incinerating waste material, which comprises a furnace having a plurality of superposed hearths including a top drying hearth or hearths and a lower incinerating hearth or hearths, means for feeding the material onto the top hearth, rabbling means cooperating with each hearth for agitating and advancing the material over each hearth and gradually from hearth to hearth down through the furnace, an opening adjacent an upper incinerating hearth through which hot gaseous products of combustion may be withdrawn, an opening from a drying hearth through which vapor evolved from the drying material may be withdrawn, said drying hearth or hearths being formed with muffle-heating cavities, means for mixing said withdrawn vapor with said withdrawn hot gaseous products, and means for conducting the mixture through said cavities whereby substantial quantities of heat of said mixture are transferred to the drying hearth or hearths.

4. Apparatus for drying and incinerating waste material, which comprises a furnace having a plurality of superposed hearths including a top drying hearth or hearths and a lower incinerating hearth or hearths, means for feeding the material onto the top hearth, rabbling means cooperating with each hearth for agitating and advancing the material over each hearth and gradually from hearth to hearth down through the furnace, an opening adjacent an upper incinerating hearth through which hot gaseous products of combustion may be withdrawn, an opening from a drying hearth through which vapor evolved from the drying material may be withdrawn, said drying hearth or hearths being formed with muffle-heating cavities, means for mixing said withdrawn vapor with said hot gaseous products, a recuperator, means for conducting a supply of air through said recuperator and into an incinerating hearth for supporting combustion, and means for conducting said mixture through said recuperator in heat exchanging relationship with said air supply and then through said cavities, whereby heat is transferred from said mixture to the incinerating portion of the furnace and also at a relatively lower temperature range to the drying portion of the furnace.

5. Apparatus for drying and incinerating waste material, which comprises a furnace having a plurality of superposed hearths including a top drying hearth or hearths and a lower incinerating hearth or hearths, means for feeding the material onto the top hearth, rabbling means cooperating with each hearth for agitating and advancing the material over each hearth and gradually from hearth to hearth down through the furnace, an opening adjacent an upper incinerating hearth through which hot gaseous products of combustion may be withdrawn, an opening from a drying hearth through which vapor evolved from the drying material may be withdrawn, said drying hearth or hearths being formed with muffle-heating cavities, means for mixing said withdrawn vapor with said hot gaseous products, means for conducting the mixture through said cavities whereby substantial quantities of the heat of said mixture are transferred to the drying hearth or hearths, a recuperator, means for conducting a supply of air through said recuperator and into contact with the material on an incinerating hearth for supporting combustion, and means for conducting said mixture after passage through said cavities, through said recuperator in heat exchanging relationship with said air supply for heating the latter.

6. Apparatus for drying and incinerating waste material, which comprises a furnace having a plurality of superposed hearths including a top drying hearth or hearths and a lower incinerating hearth or hearths, means for feeding the material onto the top hearth, rabbling means cooperating with each hearth for agitating and advancing the material over each hearth and gradually from hearth to hearth down through the furnace, an opening adjacent an upper incinerating hearth through which hot gaseous products of combustion may be withdrawn together with vapor evolved from the drying material on the drying hearth or hearths, said drying hearth or hearths being formed with muffle-heating cavities, and means for conducting said withdrawn gaseous products and vapor through said cavities whereby substantial quantities of the heat thereof is transferred to the drying hearth or hearths.

7. Apparatus for drying and incinerating waste material comprising a furnace having a plurality of superposed hearths including drying hearths and incinerating hearths, means for feeding the material onto a drying hearth, means cooperating with each hearth for agitating and advancing the material over each hearth and gradually from hearth to hearth, first over said drying hearths and then over said incinerating hearths, means for withdrawing vapor evolved from the drying material from said drying hearths, means for separately withdrawing gaseous products of combustion from the incinerating hearths, means for mixing said withdrawn vapor with the gaseous products of combustion evolved at the burning hearths at a point adjacent the region where said gases are withdrawn from said incinerating hearths, said drying hearths being formed with muffle heating cavities, and means for conducting the mixture of said gases and vapor through said cavities whereby substantial quantities of the heat of said mixture are transferred to the drying hearths.

8. Apparatus for drying and incinerating waste material comprising a furnace having a plurality of superposed hearths including drying hearths and incinerating hearths, means for feeding the material on to a drying hearth, means including members cooperating with each hearth for agitating and advancing the material over each hearth and gradually from hearth to hearth, first over said drying hearths and then over said incinerating hearths, means for withdrawing vapor evolved from the drying material from said drying hearths, means for separately withdrawing gaseous products of combustion from the incinerating hearths, means for mixing said withdrawn vapor with the gaseous products of combustion evolved at the burning hearths at a point adjacent the region where said gases are withdrawn from said incinerating hearths, said drying hearths being formed with muffle heating cavities, means for conducting the mixture of said gases and vapor through said cavities whereby substantial quantities of the heat of said mixture are transferred to the drying hearths, said rabbling members being formed with cooling conduits, means for causing a stream of air to pass through and become heated in said conduits, and means for conducting such heated air into contact with the material on said incinerating hearths.

9. Apparatus for drying and incinerating waste material which comprises a furnace having a plurality of superposed hearths including drying hearths and incinerating hearths, means for feeding the material onto a drying hearth, means for agitating and gradually advancing the material over each hearth and from hearth to hearth first over said drying hearths and then over said incinerating hearths, means for withdrawing hot gaseous products of combustion from said incinerating hearths, means for separately withdrawing vapor evolved from the drying material from said drying hearths, said drying hearths being formed with muffle heating cavities, means for mixing said withdrawn vapor with said hot gaseous products, a recuperator, means for conducting a supply of air through said recuperator and into an incinerating hearth for supporting combustion, and means for conducting said mixture through said recuperator in heat exchanging relationship with said air supply and then through said cavities, whereby heat is transferred from said mixture to the incinerating hearths and also at a relatively lower temperature range to said drying hearths.

10. Apparatus for drying and incinerating waste material which comprises a furnace having a plurality of superposed hearths including drying hearths and incinerating hearths, means for feeding the material onto a drying hearth, means for agitating and gradually advancing the material over each hearth and from hearth to hearth first over said drying hearths and then over said incinerating hearths, means for withdrawing hot gaseous products of combustion from said incinerating hearths, means for separately withdrawing vapor evolved from the drying material from said drying hearths, said drying hearths being formed with muffle heating cavities, means for mixing said withdrawn vapor with said hot gaseous products, means for conducting the mixture through said cavities whereby substantial quantities of the heat of said mixture are transferred to the drying hearths, a recuperator, means for conducting a supply of air through said recuperator to heat such air and then conducting such heated air into contact with the material on said incinerating hearths, and means for conducting said mixture after passage through said cavities, through said recuperator in heat exchanging relationship with said air supply for heating the latter.

11. Apparatus for drying and incinerating waste material which comprises a furnace having a plurality of superposed hearths including a drying hearth or hearths and an incinerating hearth or hearths, means for feeding the material onto a drying hearth, means for agitating and gradually advancing the material over each hearth and from hearth to hearth first over said drying hearth or hearths and then over said incinerating hearth or hearths, means for withdrawing gaseous products of combustion from said incinerating hearth or hearths, means for separately withdrawing vapor from said drying hearth or hearths and for mixing such vapor with said gases, said drying hearth or hearths being formed with muffle heating cavities, and means for conducting said mixture through said cavities whereby heat of the mixture is transferred to the drying hearth or hearths.

12. Apparatus for drying and incinerating waste material which comprises a furnace having a plurality of superposed hearths including a drying hearth or hearths and an incinerating hearth or hearths, means for feeding the material onto a drying hearth, means for agitating and gradually advancing the material over each hearth and from hearth to hearth first over said drying hearth or hearths and then over said incinerating hearth or hearths, means for causing a stream of air together with gaseous products of combustion to pass counter current to the material over said incinerating hearth or hearths, means for causing a stream of vapor evolved from the drying material to pass along the path of travel of the material on said drying hearth or hearths, said drying hearth or hearths being formed with muffle heating cavities, and means for mixing said gases from said incinerating hearth or hearths while said gases are heated, with vapor from said drying hearth or hearths, and means for causing the mixture to pass through said cavities for supplying heat at the drying hearth or hearths.

13. The process of drying and incinerating waste material, which comprises treating the material to mechanically remove a substantial percentage of the moisture content thereof, then passing the material successively through a plurality of zones wherein the material is first dried, and then incinerated in the presence of streams of hot gases, withdrawing the hot gaseous products of the process from a high temperature zone of incineration, bringing such hot gaseous products into heat interchanging relationship with the drying zone or zones, and also bringing such gaseous products into heat interchanging relationship with a source of air supplied to the zones of incineration, and withdrawing moisture-laden gases from the zone or zones of drying and introducing the same into a high temperature zone of incineration whereby noxious odors of the moisture-laden gases are destroyed.

14. Apparatus for drying and incinerating sewage sludge material, comprising a furnace having a plurality of superposed hearths, including a top muffle heated hearth or hearths for drying and a lower hearth or hearths for incinerating the material, an inlet at the top of said furnace provided with means for substantially continuously feeding the sludge material into the top of said furnace, rabbling means provided with teeth cooperating with each of said hearths for periodically agitating and advancing the sludge material over each hearth and gradually from hearth to hearth down through the furnace, said rabbling means embodying conduits for conveying cooling air therethrough, means for introducing such cooling air into said conduits for passage therethrough whereby such air becomes preheated, means for withdrawing hot gaseous products of combustion from above one of said incinerating hearths and utilizing such gaseous products to heat said muffle heated hearth or hearths, means for also utilizing said gaseous products of combustion for further preheating the air which has passed through said conduits, means for introducing such further preheated air at an incinerating hearth, and means for withdrawing moisture-laden gases from said drying hearth or hearths and introducing such moisture-laden gases at an incinerating hearth.

15. Apparatus for drying and incinerating sewage sludge material, comprising a furnace having a plurality of superposed hearths, including a top muffle heated hearth or hearths for drying and a lower hearth or hearths for incinerating the material, an inlet at the top of said furnace provided with means for substantially continuously feeding the sludge material into the top of said furnace, rabbling means provided with teeth cooperating with each of said hearths for periodically agitating and advancing the sludge material over each hearth and gradually from hearth to hearth down through the furnace, said rabbling means embodying conduits for conveying cooling air therethrough, means for introducing such cooling air into said conduits for passage therethrough whereby such air becomes preheated, means for withdrawing gaseous products of combustion from above a high temperature incinerating hearth and utilizing said gaseous products to further preheat said air and to also heat said muffle hearths, means for introducing such further preheated air into the lower part of the furnace, and means for withdrawing moisture-laden gases from the drying hearth or hearths and introducing the same at an incinerating hearth.

16. Apparatus for drying and incinerating waste material, comprising a plurality of superposed drying hearths, means for feeding the material onto the upper one of said hearths, means cooperating with each hearth for agitating and advancing the material over each hearth and gradually from hearth to hearth, said drying hearths being formed with muffle heating cavities, incinerating means for receiving and burning the dried material, a recuperator, conduits for conducting hot gaseous products of combustion from said incinerating means through said recuperator and then through said cavities, and conduits for conducting a supply of air through said recuperator in heat exchanging relationship with said gaseous products and thence into said incinerating means, to provide a supply of preheated air to support combustion of the material in said incinerating means.

17. Apparatus for drying and incinerating waste material, comprising a plurality of superposed drying hearths, means for feeding the material onto the upper one of said hearths, means cooperating with each hearth for agitating and advancing the material over each hearth and gradually from hearth to hearth, said drying hearths being formed with muffle heating cavities, incinerating means for receiving and burning the dried material, a recuperator, conduits for conducting hot gaseous products of combustion from said incinerating means through said recuperator and through said cavities, conduits for conducting a supply of air through said recuperator in heat exchanging relationship with said gaseous products and thence into said incinerating means, to provide a supply of preheated air to support combustion of the material in said incinerating means, and means for conducting vapor evolved from the material on said drying hearths, into said incinerating means for destruction of obnoxious odors of said vapor.

18. Apparatus for drying and incinerating waste material, comprising a plurality of superposed drying hearths, means for feeding the material onto the upper one of said hearths, means cooperating with each hearth for agitating and advancing the material over each hearth and gradually from hearth to hearth, said drying hearths being formed with muffle heating cavities, incinerating means for receiving and burning the dried material, a recuperator, conduits for conducting hot gaseous products of combustion from said incinerating means through said recuperator and through said cavities, conduits for conducting a supply of air through said recuperator in heat exchanging relationship with said gaseous products and thence into said incinerating means, to provide a supply of preheated air to support combustion of the material in said incinerating means, and means for conducting vapor evolved from the drying material from said hearths, and for mixing said vapor with hot gaseous products evolved from the burning material to destroy odors of said vapor.

19. Apparatus for drying and incinerating waste materials, comprising a drying chamber or chambers, an incinerating chamber or chambers for receiving and burning the material after passage through said drying chamber or chambers, said drying chamber or chambers being provided with muffle heating cavities, means for withdrawing from the drying chamber or chambers the vapor evolved from the drying material, means for separately withdrawing from said incinerating chamber or chambers the hot gaseous products of combustion evolved from the burning material and then mixing such gaseous products with said withdrawn vapor, and means for conducting the mixture through said cavities.

20. Apparatus for drying and incinerating waste materials, comprising a drying chamber or chambers, an incinerating chamber or chambers for receiving and burning the material after passage through said drying chamber or chambers, a recuperator, means for conducting hot gaseous products of combustion evolved from the burning material through said recuperator, means for thereafter conducting said gaseous products to said drying chamber or chambers whereby heat remaining in said gaseous products may be transferred to the drying chamber or chambers, and means for passing a supply of air through said recuperator in heat exchanging relationship with said gaseous products and then into said incinerating chamber or chambers, whereby a supply of preheated air is provided to support combustion.

21. Apparatus for drying and incinerating waste materials, comprising a drying chamber or chambers, an incinerating chamber or chambers for receiving and burning the material after passage through said drying chamber or chambers, a recuperator, means for conducting hot gaseous products of combustion evolved from the burning material through said recuperator, means for thereafter conducting said gaseous products to said drying chamber or chambers whereby heat remaining in said gaseous products may be transferred to the drying chamber or chambers, means for passing a supply of air through said recuperator in heat exchanging relationship with said gaseous products and then into said incinerating chamber or chambers, whereby a supply of preheated air is provided to support combustion, and means for conducting vapor evolved from the material in said drying chamber or chambers into the stream of said hot gaseous products evolved from the burning material at a point where said products are of a temperature sufficient to destroy odors of said vapor.

22. The process of drying and incinerating waste material, which comprises passing the material successively through a plurality of zones wherein the material is first dried, and then incinerated in the presence of streams of hot gases, withdrawing the hot gaseous products of the process from a high temperature zone of incineration, bringing such hot gaseous products into heat interchanging relationship with the drying zone or zones, and also bringing such gaseous products into heat interchanging relationship with a source of air supplied to the zones of incineration, and withdrawing moisture-laden gases from the zone or zones of drying and introducing the same into a high temperature zone of incineration whereby noxious odors of the moisture-laden gases are destroyed.

HENRY J. HARTLEY.
DUDLEY BAIRD.